J. T. PEDERSEN.
LUBRICATING APPARATUS.
APPLICATION FILED APR. 6, 1910.

1,009,562.

Patented Nov. 21, 1911.

2 SHEETS—SHEET 1.

Witnesses:
Chas H Smith
A L Serrell

Inventor:
Johannes Th Pedersen
By Harold Serrell
his Attorney.

COLUMBIA PLANOGRAPH CO., WASHINGTON, D. C.

J. T. PEDERSEN.
LUBRICATING APPARATUS.
APPLICATION FILED APR. 6, 1910.
1,009,562.
Patented Nov. 21, 1911.
2 SHEETS—SHEET 2.
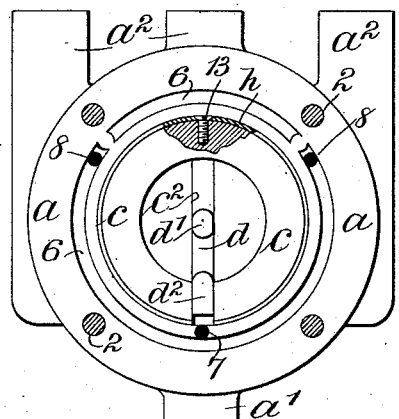
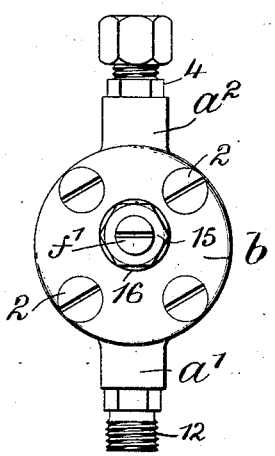
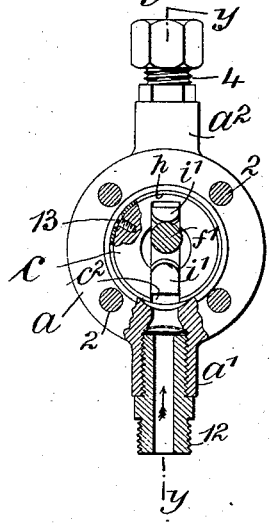
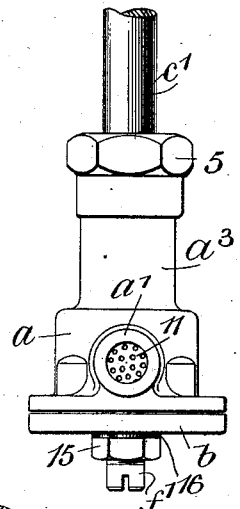
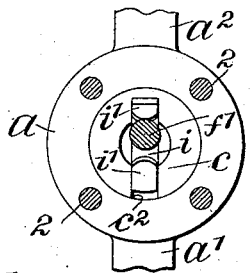
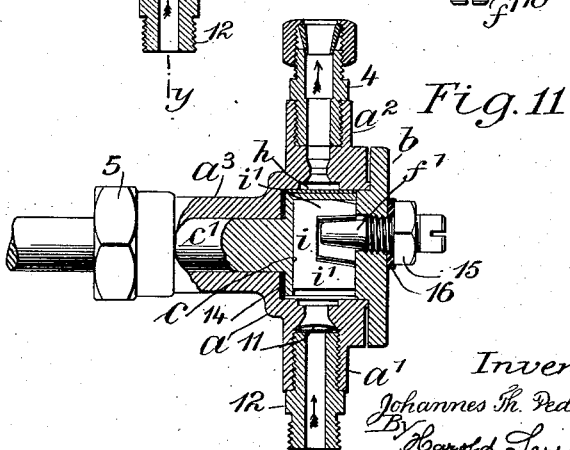
Witnesses:
Chas. H. Smith
A. P. Serrell
Inventor
Johannes Th. Pedersen.
By Harold Serrell
his Attorney.

UNITED STATES PATENT OFFICE.

JOHANNES TH. PEDERSËN, OF WOODSIDE, NEW YORK.

LUBRICATING APPARATUS.

1,009,562.            Specification of Letters Patent.     Patented Nov. 21, 1911.

Application filed April 6, 1910. Serial No. 553,825.

*To all whom it may concern:*

Be it known that I, JOHANNES TH. PEDERSËN, a citizen of the United States, residing at Woodside, in the county of Queens and State of New York, have invented an Improvement in Lubricating Apparatus, of which the following is a specification.

My invention relates to pumps and special features thereof, particularly adapted for supplying a lubricant to several parts of a mechanism simultaneously and which mechanism requires lubrication, or to several similar adjacent machines; and while the pump made according to my invention is adapted for the lubrication of any machine it is especially adapted for the lubrication of the running parts of motor vehicles.

In carrying out my invention I employ a casing having a single inlet for lubricant and a plurality of outlets, a rotary member within the casing, a cover or sealing plate to the casing and a single acting piston or ejector member and means by and through the coöperation of the rotary member in the turning thereof to cause the said ejector or piston member to reciprocate and so draw in the oil from the single inlet and distribute it to all or any of the plurality of outlets in full or regulatable quantities.

The pump device whether employing a single inlet and plurality of outlets, or a single inlet and single outlet, may be made with a spring-washer for holding the revoluble member snugly against the cover plate, an annular packing ring around the cylindrical head of the revoluble member and a screen or strainer at the inlet for lubricant, all of which will be hereinafter more particularly described.

Figure 1:
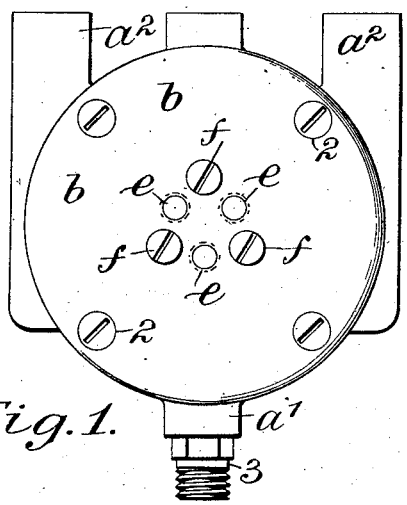
Figure 2:
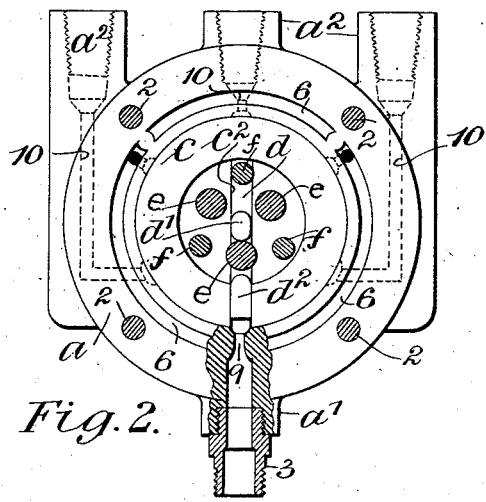
Figure 3:
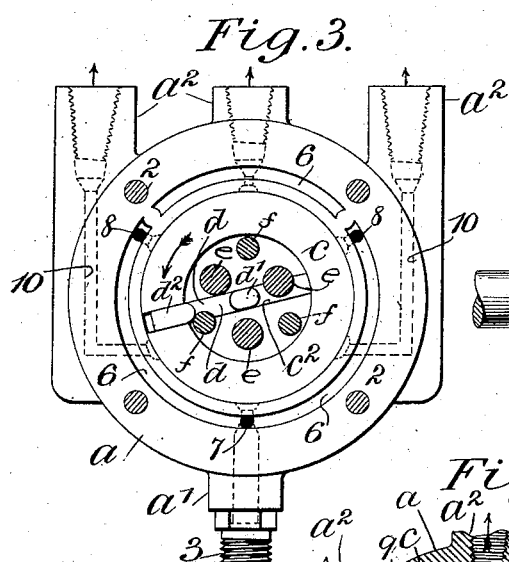
Figure 4:
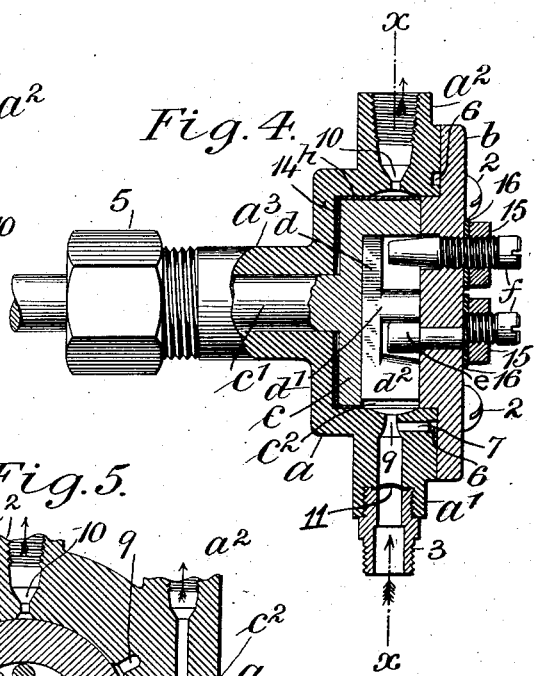
Figure 5:
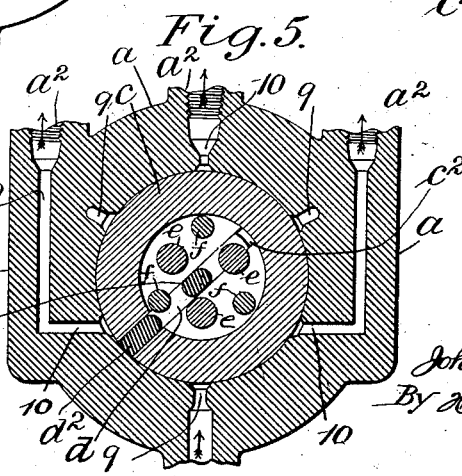

In the drawing, Figures 1 and 7 are front elevations of forms of pumps in which the improvements embodied in my present invention are employed. Figs. 2 and 3 are elevations and partial sections of the form shown by Fig. 1 with the cover or sealing plate removed, showing the ejector or piston member in different positions. Fig. 2 showing a section of the single inlet for the lubricant. Fig. 4 is a vertical longitudinal section through the device of my improvement shown in Fig. 1 with a part shown in elevation. Fig. 5 is a vertical transverse section on about the dotted line $x, x,$ of Fig. 4. Fig. 6 is an elevation and partial section similar to Fig. 2, but showing a further improvement. Fig. 8 is an elevation and partial section through the form of my invention shown in Fig. 7, with the cover plate removed. Fig. 9 is an inverted plan of the form of my invention shown in Figs. 7 to 11 inclusive. Fig. 10 is an elevation and partial section back of the cover plate with the section also made through the inlet connection, and Fig. 11 is a vertical longitudinal section at substantially the dotted line $y, y,$ of Fig. 10.

Similar letters of reference indicate similar parts in all the figures.

Referring particularly to Figs. 1 to 5 inclusive, $a$ represents the casing with a single inlet connection at $a^1$ and a plurality of outlet connections $a^2$ and with a hollow cylindrical member $a^3$. $b$ represents a cover or sealing plate adapted to fit over the outer surface of the casing and the same is secured in position by screws 2. In these figures the inlet connection $a^1$ is provided with an inlet pipe 3 while in Figs. 7 to 11 inclusive, the outlet connection is provided with a pipe-fitting 4. The free end of the hollow cylindrical member $a^3$ is provided with a nut 5 within and between which and the end of the hollow cylindrical member is formed a stuffing box to effect a tight joint. The revoluble member within the casing comprises a cylindrical head $c$ with a circular central recess and a stem or shaft $c^1$ fitting within the hollow cylindrical member $a^3$. The cylindrical head $c$ at the base of the recess and through one wall of the same is provided with a transverse slot $c^2$ adapted to receive the piston or ejector $d$ which in most of the figures of the drawing is provided with a pin $d^1$ and a head end $d^2$. This piston fits very snugly and as the parts are continually flooded with lubricant that is being fed, the piston is easily moved by the means provided therefor.

Referring particularly to Figs. 2, 3, 4 and 6, the face of the casing $a$ is provided with a circular port 6 which is advantageously stopped off or divided into several parts by transverse partitions preferably formed after the formation of the circular port by pins inserted in the casing. This casing is also provided with a supply port 7 which opens from the inlet 3 to the circular port 6. The casing is also provided with lateral ports 8 which open from the circular port 6 to the internal ports 9; the number of these ports 9 agreeing with the number of the outlet connections $a^2$. This casing is also provided with discharge ports 10 which also agree in number with the outlet connections $a^2$ and which extend to the inner surface of the casing adjacent to the periphery of the revoluble member. On the cover or sealing plate $b$ there are a series of three equidistant equally spaced pins $e$ which pass through this cover plate with their free ends within the circular recess of the cylindrical head $c$. There are also screw pins $f$ in a series of three passing through the cover plate $b$ and spaced intermediate to the pins $e$, the inner free ends of which preferably taper and also enter into the circular central recess of the cylindrical head $c$.

In Figs. 7 to 11 inclusive of the drawing the length of the piston or ejector member is shorter than the diameter of the cylindrical head, while in Figs. 1 to 6 inclusive, the length of the piston is shorter than so much of the diameter of the cylindrical head as extends from the circumference of the head to the opposite inner wall of the central recess. This condition may well be appreciated particularly in the section Fig. 5. In all the figures of the drawing the piston is single-acting.

The construction of the parts Figs. 1 to 6 inclusive, and 7 to 11 inclusive, is substantially the same. In the latter group of figures however, there is only a single inlet and a single discharge. Some of the special features of my invention which are applicable to the forms shown in all the figures of the drawing are shown particularly in Figs. 4, 6, 9, 10 and 11, and comprise the following,—all of which are equally applicable if desired, to the forms of the invention shown in all the figures.

In Figs. 9 and 10, 11 represents a screen, or in other words, a perforated plate fitting within the single inlet to the casing and serving the purpose of keeping out of the casing any foreign material or particles that might interfere with the free operation of the parts therein. This screen is advantageously maintained in position by the coupling 12 entering the tubular part of the casing almost to the seat of the screen.

I have shown in Figs. 6, 10 and 11, an annulus packing ring $h$ around the cylindrical head of the revoluble member and held in place by one or more screws 13. This packing ring is separated at the inlet opening to the revoluble member but it serves to make the same a perfect joint between the circumference of the cylindrical head and the circular recess of the casing, particularly if the packing ring is of a different metal than the casing.

Referring to Figs. 8, 10 and 11, the ejector or piston member $i$ is provided with arms $i^1$ on the respective ends thereof, the same being a modification of the form of ejector or piston shown in Figs. 2 to 6 inclusive.

In Figs. 4 and 11 I have illustrated a spring dished washer 14 as coming between the back of the cylindrical head and the inner face of the casing and touching said parts on opposite sides at its inner and outer boundaries and performing the function of pressing the cylindrical head forward toward the cover or sealing plate $b$ so as to maintain between said parts especially a liquid tight joint. This spring washer 14 is normally slightly dishing in cross section as will be particularly manifest from 4. When in position, of course, it is in nearer a plane than when out of the casing.

The screw pins $f$ in Figs. 1 to 5 inclusive, as well as the screw pin $f^1$ in Fig. 11, all preferably taper and are preferably held in position by nuts 15 between which and the outer face of the cover plate washers 16 are employed so that there may be no leak and also so that the axial position of these pins with reference to the cover plate may be maintained and a shifting prevented which would occur if the pins were allowed to rotate.

By an examination of Figs. 4 and 11 particularly, it will be apparent that the inner surfaces of the head ends $d^2$ and arms $i^1$ are inclined, consequently the farther the pins $f$ $f^1$ project into the circular recess of the cylindrical head touching said inclines, the greater will be the movement of the reciprocating piston or ejector; consequently it is apparent that these pins may all be placed alike, or some of them may project more than others, particularly is this so with reference to the device of Figs. 1 to 6 inclusive, and by such positioning of the pins the greater or less movement may be imparted to the piston or ejector, causing more or less lubricant to be passed through the pump to the varying places of destination according to the quantity of oil that may be necessary for lubricating the several devices connected with the outlet connection to the pump.

Referring to Figs. 1 to 6 inclusive, the operation of the pump is effected by rotating the cylindrical head $c$ and stem $c^1$ by any suitable prime mover acting upon the stem $c^1$. In case of an automobile this would probably be a band wheel on the stem $c^1$ connected to a pulley or band wheel on a rotating part of the auto with an intervening belt. In the rotation of the cylindrical head $c$ the reciprocation of the piston is effected to draw in lubricant from the main inlet 3 and any one or all of the intake ports 9 by the pins $e$ striking the member $d^1$ of the piston in the rotation of the head and retracting the same with reference to the cylindrical head and the amount of this retraction is constant so that the same amount of oil is drawn in each time. The several pins *f*, all of which are adjustable with the rotation of the cylindrical head strike the inclined surface of the head end $d^2$ to force the single acting piston or ejector outward toward the periphery of the cylindrical head and so eject the fluid previously drawn into the pocket such as shown in Fig. 3 into any one or all of the discharge ports 10 and the amount of movement and consequent oil discharge agrees with the amount of insertion of the pins *f*. In fact according to the construction shown in Figs. 1 to 6 inclusive, the single acting piston may draw in lubricant and discharge the same three times in one revolution, that is to say, from the lowermost port 9 delivering the same to the right hand port 10 and from the upper right hand port 9 delivering the same to the upper central port 10 and from the left hand port 9 delivering the same to the left hand port 10; the parts in Fig. 5 being shown as if the piston had just delivered lubricant to the left hand port 10 and is now closed, moving around to the lowest port 9 to be lifted by the lowest pin *e* to receive the lubricant and then closed by the right hand pin *f* to force the lubricant into the right hand port 10 and so repeat the process continuously with the rotation of the cylindrical head under the reciprocation of the piston *d*.

Figs. 7 to 11 inclusive have been shown mainly to illustrate the possibility of the use in a single intake and single out-take pump of a single acting piston and also the application to this form of pump of the screen 11, the packing ring *h* and the spring washer 14. The packing ring *h* is also shown in Fig. 6 and the spring washer 14 in Fig. 4 so as to show the equal adaptability of these parts with the form of invention shown in Figs. 1 to 6 inclusive, and it is therefore quite apparent that the screen 11 is as well adapted to the form shown in Figs. 1 to 6 inclusive, as the form shown in Figs. 7 to 11 inclusive.

In the form of my invention shown in Figs. 7 to 11 inclusive, the single adjustable pin $f^1$ controls the amount of lubricant passing through the pump so that the same amount is discharged as is drawn in, while in the form shown in Figs. 1 to 6 inclusive, the stationary pins *e* insure a constant supply of lubricant being handled or drawn in by the pump while the adjustable pins *f* regulate the discharge which may be equal to or less than the intake capacity. The discharge may also be varied at the several outlets by adjusting the position of the pins *f* as desired.

I do not herein limit my invention to the employment of a series of three pins *e* and a series of three adjustable pins *f*, as the number may be increased or diminished at pleasure and is only governed by the number of the discharge ports employed.

I claim as my invention:

1. In a lubricating apparatus, the combination with a casing, a cover plate therefor and a revoluble member within the casing having a circular central recess, of a single inlet to the casing for lubricant, a plurality of outlets for delivering the lubricant from the casing, a reciprocating piston in the revoluble member, a series of intake ports within the casing around the revoluble member and a series of discharge ports within the casing around the revoluble member and extending to the plurality of outlets, and means for actuating the reciprocating piston so as to draw in lubricant and discharge the same.

2. In a lubricating apparatus, the combination with a casing, a cover plate therefor and a revoluble member within the casing having a circular central recess, of a single inlet to the casing for lubricant, a plurality of outlets for delivering the lubricant from the casing, a reciprocating piston in the revoluble member, a circular port in the face of the casing, a series of ports communicating therewith and from the single inlet and spaced around the revoluble member, and a series of intermediately placed discharge ports and means for actuating the reciprocating piston causing the same to draw in lubricant to a regulatable extent from the intake ports and discharge the same into the discharge ports.

3. In a lubricating apparatus, the combination with a casing, a cover plate therefor, a revoluble member having a central circular recess within the same and said revoluble member being within the casing, and inlet and discharge outlets, of a piston or ejector and means for actuating the same, and an annulus packing ring within the casing and extending around the revoluble member except at the piston intake thereof, with means for securing the annulus packing ring in position.

4. In a lubricating apparatus, the combination with a casing, a cover plate therefor, a revoluble member having a central circular recess within the same and said revoluble member being within the casing, and inlet and discharge outlets, of a piston or ejector and means for actuating the same, and a spring dished washer inserted in the casing and between the inner face thereof and the back face of the revoluble member, for closing off the escape of oil and also performing the function of pressing the revoluble member forward for a liquid tight joint against the inner surface of the cover or sealing plate.

5. In a lubricating apparatus, the combination with a casing, a cover plate therefor, a revoluble member within the casing having a circular central recess and a reciprocating piston in the revoluble member, of a single inlet to the casing for lubricant, a plurality of outlets for delivering the lubricant from the casing, a circular groove in the face of the casing forming a port communicating with the single inlet, series of ports communicating from this circular port and the latter stopped off between the series of ports, a series of intermediately placed ports surrounding the revoluble member and communicating with the aforesaid series of ports and openings into the plurality of outlets, a series of devices for progressively actuating the reciprocating piston in either direction so as to discharge the lubricant into the outlet ports and a second series of devices for actuating the piston to draw in the lubricant.

6. In a lubricating apparatus, the combination with a casing, a cover plate therefor, a revoluble member within the casing having a circular central recess and a reciprocating piston in the revoluble member, of a single inlet to the casing for lubricant, a plurality of outlets for delivering the lubricant from the casing, a circular groove in the face of the casing forming a port communicating with the single inlet, series of ports communicating from this circular port and the latter stopped off between the series of ports, a series of intermediately placed ports surrounding the revoluble member and communicating with the aforesaid series of ports and opening into the plurality of outlets, a series of devices for progressively actuating the reciprocating piston in either direction so as to discharge the lubricant into the outlet ports, and a series of axially movable adjustable devices for simultaneously or regulatably actuating the reciprocating piston to draw in the lubricant to the desired extent.

7. In a lubricating apparatus, the combination with a casing and a cover plate therefor, of a revoluble member within the casing having a circular central recess and the revoluble member channeled in the base of the central circular recess and one wall cut through, a reciprocating piston shorter in length than the length of the groove so formed in the revoluble member and said piston provided with an approximately central pin and head end, and a series of devices for actuating the piston and alternately contacting with the pin thereof and with the head end thereof for drawing in and discharging lubricant.

8. In a lubricating apparatus, the combination with a casing and a cover plate therefor, of a revoluble member within the casing having a circular central recess and the revoluble member channeled in the base of the central circular recess and one wall cut through, a reciprocating piston shorter in length than the length of the groove so formed in the revoluble member and said piston provided with an approximately central pin and head end, a series of stationary pins entering the said central recess, equally spaced apart and all adapted in the rotation of the revoluble member to move the reciprocating piston outwardly in discharging the lubricant and an intermediately placed series of adjustable pins also entering the said circular recess and with the revolution of the revoluble member acting upon the approximately central pin of the reciprocating piston to draw the same inward and in so doing draw in the lubricant prior to the opposite movement in ejecting the same.

9. In a lubricating apparatus, the combination with a casing, a cover plate therefor and a revoluble member within the casing having a circular central recess, of a single inlet to the casing for lubricant, a plurality of outlets for delivering the lubricant from the casing, a reciprocating piston in the revoluble member, a circular port in the face of the casing beneath the cover plate, a port 7 connecting the single inlet with the circular port, ports 9 in the interior of the casing equally spaced with the inlet port around the revoluble member and ports 8 communicating between the ports 9 in the circular port in the face of the casing and discharge ports 10 equally spaced apart around the revoluble member and communicating with the outlets for delivering the lubricant, whereby a series of equally spaced inlet ports are established, all of which act equally to draw in the lubricant, and a series of intermediately placed discharge ports are established from all of which the lubricant may be discharged and means for actuating the reciprocating piston for the performance of said functions.

Signed by me this 24th day of March 1910.

JOHANNES TH. PEDERSEN.

Witnesses:
Geo. T. Pinckney,
E. Zachariasen.